(12) United States Patent
Klingbeil (10) Patent No.: US 10,647,203 B2
(45) Date of Patent: May 12, 2020

(54) VEHICLE BATTERY CHARGING SYSTEM

(71) Applicant: General Electric Company, Schenectady, NY (US)

(72) Inventor: Adam Edgar Klingbeil, Niskayuna, NY (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 150 days.

(21) Appl. No.: 15/860,214

(22) Filed: Jan. 2, 2018

(65) Prior Publication Data

US 2019/0202293 A1 Jul. 4, 2019

(51) Int. Cl.
| | | |
|---|---|---|
| *B60W 10/08* | (2006.01) | |
| *B60W 10/06* | (2006.01) | |
| *B60L 3/00* | (2019.01) | |
| *B60L 7/14* | (2006.01) | |
| *B60L 15/32* | (2006.01) | |
| *B60L 15/20* | (2006.01) | |
| *B60L 50/61* | (2019.01) | |

(Continued)

(52) U.S. Cl.
CPC .......... *B60L 3/0046* (2013.01); *B60L 3/0069* (2013.01); *B60L 7/14* (2013.01); *B60L 15/20* (2013.01); *B60L 15/32* (2013.01); *B60L 50/51* (2019.02); *B60L 50/61* (2019.02); *B60L 58/40* (2019.02); *Y10S 903/903* (2013.01)

(58) Field of Classification Search
CPC .......... B60L 3/0046; B60L 7/14; B60L 15/32; B60L 50/51; B60L 3/0069; B60L 58/40; B60L 50/61; B60L 15/20; Y10S 903/903
See application file for complete search history.

(56) References Cited

U.S. PATENT DOCUMENTS 5,617,003 A * 4/1997 Odachi ................. H01M 10/44
320/108
7,304,445 B2 * 12/2007 Donnelly ................. B60L 7/06
318/108

(Continued)

OTHER PUBLICATIONS

Lee et al., "Economic evaluation of wireless charging tram system", 2016 IEEE 19th International Conference on Intelligent Transportation Systems (ITSC), pp. 1223-1228, Rio de Janeiro, Nov. 1-4, 2016 (6 pages).

*Primary Examiner* — Alfonso Perez Borroto
*Assistant Examiner* — Esayas G Yeshaw
(74) *Attorney, Agent, or Firm* — Christopher R. Carroll; The Small Patent Law Group LLC (57) ABSTRACT

A system includes a conversion circuit of a vehicle system that conductively couples a conversion device with first motors of the vehicle system. The electrical conversion device converts non-electrical energy into conversion-based electric current that is conducted to the first motors. The system also includes a storage circuit of the vehicle system that conductively couples a storage device with second motors of the vehicle system. The storage device supplies stored electric current to the second motors of the vehicle system. The system also includes a controller configured to control the second motors to brake and generate charging electric current that is conducted through the storage circuit to charge the storage device. The conversion circuit and the storage circuit are separate circuits such that the storage device is not charged with the conversion-based electric current conducted in the conversion circuit.

20 Claims, 2 Drawing Sheets

(51) Int. Cl.
*B60L 50/51* (2019.01)
*B60L 58/40* (2019.01)

(56) References Cited

U.S. PATENT DOCUMENTS

| | | | |
|---|---|---|---|
| 7,362,005 B2 | 4/2008 | Leblanc | |
| 7,444,944 B2 | 11/2008 | Kumar et al. | |
| 7,571,683 B2 | 8/2009 | Kumar | |
| 7,615,875 B1 * | 11/2009 | Henneberg | H01M 8/04604 290/1 A |
| 7,696,642 B2 * | 4/2010 | Wakitani | H02J 1/10 307/65 |
| 7,939,970 B1 * | 5/2011 | Walling | F03D 7/0284 290/44 |
| 8,188,710 B2 | 5/2012 | Ichikawa et al. | |
| 8,342,103 B2 | 1/2013 | Barbee et al. | |
| 8,371,230 B2 | 2/2013 | Kumar | |
| 8,408,144 B2 | 4/2013 | Read | |
| 8,417,400 B2 | 4/2013 | Toth | |
| 8,423,209 B2 | 4/2013 | Ichikawa | |
| 8,476,863 B2 | 7/2013 | Paasch | |
| 8,594,873 B2 | 11/2013 | Kimura et al. | |
| 8,708,083 B2 | 4/2014 | Dewis et al. | |
| 8,773,065 B2 | 7/2014 | Ang | |
| 8,860,363 B2 | 10/2014 | Ang | |
| 8,996,893 B2 * | 3/2015 | Ohashi | H02M 3/156 713/300 |
| 2007/0272116 A1 | 11/2007 | Bartley et al. | |
| 2013/0005579 A1 * | 1/2013 | Vaucher | H01L 39/143 505/166 |
| 2013/0314039 A1 | 11/2013 | Weber et al. | |
| 2015/0321659 A1 * | 11/2015 | Sato | B60K 6/445 701/22 |
| 2016/0257294 A1 * | 9/2016 | Morisaki | B60W 20/12 |

* cited by examiner

VEHICLE BATTERY CHARGING SYSTEM

FIELD

The subject matter described herein relates to electric circuits of vehicles.

BACKGROUND

Known vehicles are propelled by electric motors. These motors can be powered by a combination of an engine and an alternator (or generator), or can be powered by one or more batteries. Some vehicles are hybrid vehicles having the ability to power the motors of the hybrid vehicles using a combination of electric current created by the engine-alternator (or generator) combination and electric current supplied by batteries.

One challenge with hybrid vehicles is that expensive power electronics may be required to connect the batteries of the vehicles to a main power bus that conducts current to the motors. These electronics protect circuitry and batteries from being overloaded or otherwise damaged by current created by the engine and alternator (or generator) combination and also adjust the electrical voltages to send electrical current in a proper or designated direction. But, the electronics also significantly add to the cost and complexity of the vehicles.

BRIEF DESCRIPTION

In one embodiment, a system is provided that includes a conversion circuit of a vehicle system that conductively couples a conversion device with one or more first motors of the vehicle system. The electrical conversion device is configured to convert non-electrical energy into conversion-based electric current that is conducted in the conversion circuit to the one or more first motors to power the one or more first motors. The system also includes a storage circuit of the vehicle system that conductively couples a storage device with one or more second motors of the vehicle system. The storage device is configured to supply stored electric current to the one or more second motors of the vehicle system to power the one or more second motors. The system also includes a controller configured to control the one or more second motors to brake and generate charging electric current that is conducted through the storage circuit to the storage device to charge the storage device. The conversion circuit and the storage circuit are separate circuits such that the storage device is not charged with the conversion-based electric current conducted in the conversion circuit.

In one embodiment, a method is provided that includes conductively coupling a conversion device with one or more first motors of a vehicle system using a conversion circuit of the vehicle system. The conversion device is configured to convert non-electrical energy into conversion-based electric current that is conducted in the conversion circuit to the one or more first motors to power the one or more first motors. The method also includes conductively coupling a storage device with one or more second motors of the vehicle system using a storage circuit of the vehicle system. The storage device is configured to supply stored electric current to the one or more second motors of the vehicle system to power the one or more second motors. The one or more first motors are configured to generate propulsive effort to propel the vehicle system while the one or more second motors are controlled to brake and generate charging electric current that is conducted through the storage circuit to the storage device to charge the storage device. The conversion circuit and the storage circuits are separate circuits such that the storage device is not charged with the conversion-based electric current conducted in the conversion circuit.

In one embodiment, a system is provided that includes a vehicle controller configured to control one or more first motors and one or more second motors of a vehicle system. The one or more first motors are conductively coupled with a conversion device by a conversion circuit of the vehicle system, the one or more second motors conductively coupled with a storage device by a storage circuit of the vehicle system. The conversion device is configured to convert non-electrical energy into conversion-based electric current that is conducted in the conversion circuit to the one or more first motors to power the one or more first motors. The storage device is configured to supply storage-based electric current to the one or more second motors of the vehicle system to power the one or more second motors. The controller is configured to control the one or more second motors to brake and generate charging electric current that is conducted through the storage circuit to the storage device to charge the storage device while the one or more first motors generate propulsive effort to propel the vehicle system. The conversion circuit and the storage circuit are separate circuits such that the storage device is not charged with the conversion-based electric current conducted in the conversion circuit.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide a vehicle battery charging system. The system provides for separate circuits for different subsets of motors of a vehicle system. One circuit couples a first subset of motors with a conversion device that converts non-electrical energy into electric current, while another circuit couples a different, non-overlapping second subset of the motors (e.g., none of the same motors as the first subset) with one or more storage devices that store electric energy. The conversion device can be one or more devices that convert mechanical energy or movement, chemical energy, or the like, into electric current. Examples of conversion devices include alternators or generators (which convert rotation created by a combustion engine, a gas turbine engine, a linear piston alternator, or the like, into electric current), fuel cells (which convert chemical energy from fuel and air into electric current), etc. Examples of the storage devices include batteries, capacitors, flywheels, springs, or the like.

These circuits are completely separate and isolated from each other such that each circuit is not conductively coupled or inductively coupled with the other circuit. Stated differently, the circuits may be separate such that no current passes, is conducted, or otherwise flows from one circuit to the other circuit. For example, there may not be any bus, wire, cable, transformer, or other component that transfers electric current or energy from one circuit to the other circuit.

One of these circuits can be referred to as a conversion circuit as the circuit conductively couples the first subset of motors with the conversion device. The other circuit can be referred to as a storage circuit as the circuit conductively couples the second subset of motors with one or more storage devices. In operation, the storage device(s) can be charged by using the conversion device to power the first subset of traction motors to create tractive effort while simultaneously or concurrently braking with the second subset of motors. For example, the second subset of motors can create electric current using regenerative braking.

The tractive or propulsive effort generated by the first subset of motors can be greater than the braking effort generated by the second subset of motors so that the vehicle system is propelled along a route. While the vehicle system may not move as fast along the route as the vehicle system would move without the second subset of motors braking, the vehicle system is able to continue moving while also charging one or more storage devices of the storage circuit. Alternatively, in order to maintain vehicle speed, more power may be required from the engine during battery charging than would otherwise be required. The charged storage devices can later be used to power the second subset of motors to augment or replace the tractive or propulsive effort generated by the first subset of motors.

In one embodiment, a conversion electrical bus or circuit (that conducts current from the conversion device to the first subset of motors) and a storage electrical bus or circuit (that conducts current from the storage device(s) to the second subset of motors) are isolated, but an engine can still be used to charge the storage device(s) without the conversion device that is driven by the engine being conductively or inductively coupled with the storage device(s). For example, the storage device(s) can be charged by current generated by the second subset of traction motors that create braking effort that partially counteracts the tractive effort created by the first subset of traction motors.

For example, a storage device onboard a vehicle system may be depleted or nearly depleted of energy, and the vehicle system may require 1,000 horsepower (e.g., 746 kilowatts) of tractive effort to propel the vehicle system. A controller of the vehicle system can control a conversion device (and/or associated engine) to generate 2,000 horsepower (e.g., 1,500 kilowatts) via the first subset of motors. This same controller also can control the motors of the second subset to generate 1,000 horsepower of braking effort. This results in a net 1,000 horsepower of tractive or propulsive effort to move the vehicle system along a route, while also charging the storage device(s) using the regenerative current created by the motors in the second subset.

The vehicle system can be formed from a single vehicle having a single operator cab. This vehicle can carry passengers and/or cargo, and is not mechanically coupled with another propulsion-generating vehicle. Optionally, the vehicle system can be formed from two or more vehicles that are coupled with each other (e.g., in a vehicle consist). The conversion circuit and storage circuit can be disposed onboard the same single vehicle, or can be onboard different vehicles of this multi-vehicle system. For example, a conversion circuit onboard a first vehicle in the vehicle system can generate a larger amount of tractive or propulsive effort (using traction motor(s) included in or coupled with the conversion circuit) than the braking effort generated by traction motor(s) a storage circuit onboard a second vehicle in the vehicle system. The conversion circuit of the first vehicle creates enough tractive effort to propel the vehicle system and to charge the storage device(s) of the second vehicle.

At least one embodiment of the inventive subject matter described herein does not require any electrical connection between a battery and an engine in order to charge the battery. The battery can drive one subset of traction motors in a vehicle, and a combination of an engine, alternator, and main electrical bus can drive a different subset of traction motors in the same vehicle. This enables a range of battery sizes to be used in the vehicle, which is different from battery-powered freight cars or vehicles there only supply current to a vehicle having electric motors. Hybrid vehicles or all electric vehicles can draw mechanical energy from one or more other vehicles (e.g., in a consist formed by connected vehicles).

At least one technical effect provided by the inventive subject matter described herein includes circuitry that charges a storage device of a hybrid vehicle system while motor(s) of the vehicle system also are powered by to propel the vehicle system, without a conversion device being used to charge the storage device. The same storage device can later power other motor(s) of the same vehicle system to propel the vehicle system.

Figure 1:
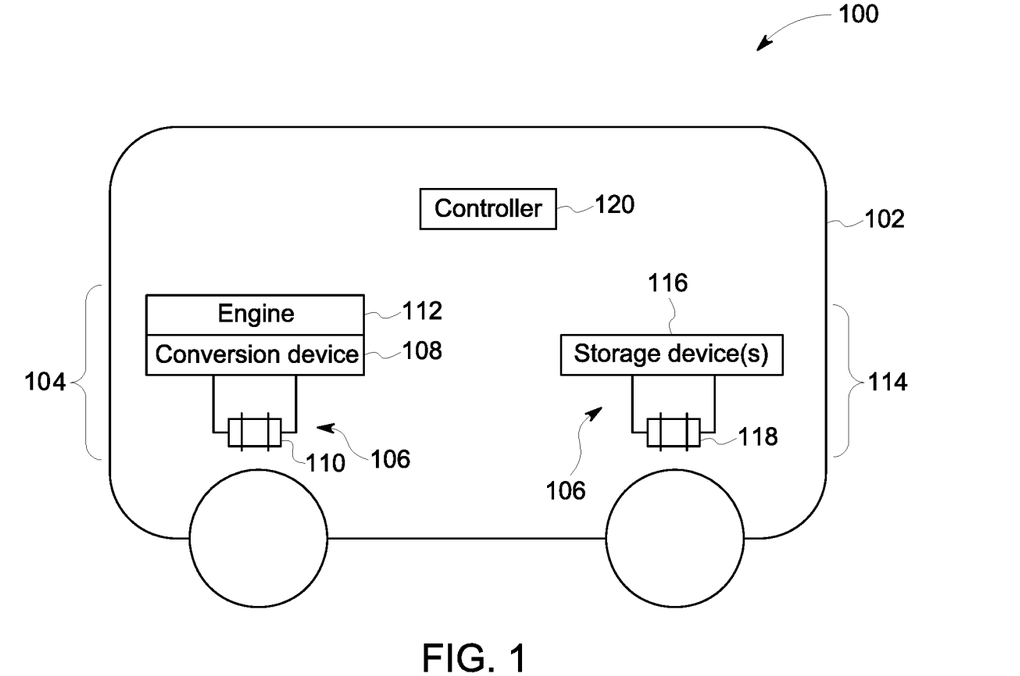
FIG. 1 schematically illustrates one embodiment of a vehicle battery charging system.

FIG. 1 schematically illustrates one embodiment of a vehicle battery charging system 100. The system 100 can be disposed onboard a variety of different types of vehicle systems 102, such as automobiles, rail vehicles (e.g., locomotives), marine vessels, mining vehicles, other off-highway vehicles (e.g., vehicles that are not designed or that are not legally permitted to operate on public roadways). In the illustrated embodiment, the vehicle system 102 is formed from a single vehicle that is not coupled with any other propulsion-generating vehicle.

The charging system 100 and/or the vehicle system 102 include a conversion circuit 104 that is formed from one or more conductive pathways 106 (e.g., conductive buses, wires, cables, etc.) that conductively couple an electrical conversion device 108 with one or more first motors 110 of the vehicle system 102. The electrical conversion device 108 is configured to convert one form of energy into electric current. For example, the conversion device 108 can be an alternator or generator that is connected with an engine 112. The engine 112 creates mechanical energy that is converted into the electric current by the conversion device 108. Optionally, the system 100 may not include the engine 112. For example, the conversion device 108 can be a fuel cell that converts fuel and/or air into electric current, a wind or other type of turbine that converts rotational movement of turbine blades into electric current, a gas turbine engine, or the like.

One or more additional hardware components can treat or modify this current before the conductive pathways 106 conduct the current to the motors 110 to power the motors 110. For example, one or more inverters or rectifiers can convert the electric current between direct and alternating current. The powered motors 110 can generate tractive or propulsive effort to propel the vehicle system 102 along one or more routes. The motors 110 can be coupled with transmissions, gears, axles, wheels, etc., of the vehicle system 102 to propel the vehicle system 102.

The charging system 100 includes a storage circuit 114 of the vehicle system 102 that conductively couples one or more storage devices 116 with one or more second motors 118 of the vehicle system 102. The storage circuit 114 also is formed from one or more conductive pathways 106 that conductively couple the storage device(s) 116 with the second motors 118. The storage device(s) 116 can include devices that store electric energy, such as batteries, flywheels, capacitors, springs, etc. The electric energy storage in the storage device(s) 116 can be conducted as electric current over or through the pathways 106 of the storage circuit 114 to the second motors 118 of the vehicle system 102 to power the second motors 118. For example, the second motors 118 can be powered by the storage device(s) 116 to propel the vehicle system 102. One or more additional hardware components can treat or modify this current before the conductive pathways 106 conduct the current to the motors 118 to power the motors 118. For example, one or more inverters or rectifiers can convert the electric current between direct and alternating current.

As shown in FIG. 1, the conversion circuit 104 and the storage circuit 114 are entirely separate or completely separate circuits. The components of the conversion circuit 104 are not conductively or inductively coupled with any component of the storage circuit 114, and the components of the storage circuit 114 are not conductively or inductively coupled with any component of the conversion circuit 104. The circuits 104, 114 are not conductively coupled with each other because there is no temporary or permanent conductive pathway that connects the circuits 104, 114 with each other. For example, there is no bus, wire, cable, switch, or relay that is directly or indirectly connected with both circuits 104, 114. Additionally, the circuits 104, 114 are not inductively coupled with each other because there is no temporary or permanent inductive connection that connects the circuits 104, 114 with each other. For example, there is no transformer or inductor that is directly or indirectly connected with both circuits 104, 114.

The charging system 100 and/or the vehicle system 102 includes a controller 120 that controls operation of the circuits 104, 114 and components of the circuits 104, 114. The controller 120 represents circuitry that includes and/or is connected with one or more processors (e.g., one or more microprocessors, field programmable gate arrays, and/or integrated circuits). The processors control operation of the vehicle system 102, such as by communicating control signals to the engine 112, conversion device 108, storage device(s) 116, and/or motors 110, 118 to control operation of each of these components. Although not shown in FIG. 1, the controller 120 can receive input from an operator via one or more input devices (e.g., throttles, pedals, buttons, switches, touchscreens, etc.) to control operation of these components, and/or can automatically control operation of these components.

In operation, the controller 120 can use one or both of the circuits 104, 114 to power the corresponding motors 110, 118 to propel the vehicle system 102. For example, during operation in a geographic area having restrictions on vehicle emissions and/or in a geographic area having flatter surfaces on which the vehicle system 102 travels, the controller 120 can direct the storage device(s) 116 to supply electric current in the storage circuit 114 to the motors 118 to propel the vehicle system 102. During operation outside of these geographic areas, the controller 120 can direct the conversion device 108 to supply electric current to the motors 110 to propel the vehicle system 102.

The controller 120 can monitor a charge state or level of the storage device(s) 116 using one or more sensors coupled with the battery or batteries 116 (not shown). The controller 120 can determine that the charge state or level is sufficiently low (e.g., below a designated threshold, such as 5%, 10%, or 20% of the total available storage of the storage device 116) that the storage device(s) 116 require charging. Alternatively, the controller 120 can determine that the storage device(s) 116 require charging based on operator input.

In response to determining that the storage device(s) 116 are to be charged, the controller 120 can calculate or otherwise determine an amount of tractive or propulsive effort that is needed to propel the vehicle system 102 along one or more routes. This amount can be determined based on previous travels of the vehicle system 102, based on the size and/or weight of the vehicle system 102, based on the grade and/or curvature of the vehicle system 102, or the like. For example, larger and/or heavier vehicle systems 102 may require greater tractive or propulsive effort than smaller and/or lighter vehicle systems 102, steeper inclines in the route and/or sharper curves in the route can require larger tractive or propulsive efforts to propel the vehicle system 102 than flatter or downhill grades in the route and/or curves with larger radii of curvature.

The controller 120 can direct the engine 112, the conversion device 108, and/or the motors 110 of the conversion circuit 104 to operate at speeds and/or torques that provide more than the amount of tractive or propulsive effort that is calculated as being needed to propel the vehicle system 102 along one or more routes. For example, the controller 120 can direct the engine 112 to generate at least 1,000 more horsepower than is needed to travel over an upcoming segment of the route. The surplus tractive or propulsive effort (above the amount needed to keep the vehicle system 102 moving on the route) can then be used to charge the storage device 116 of the storage circuit 114.

The controller 120 can direct the motors 118 of the storage circuit 114 to generate braking effort that is less than this surplus of tractive or propulsive effort. For example, if the engine 112 is operating to generate 1,000 more horsepower than is needed to move the vehicle system 102, then the controller 120 can direct the motors 118 in the storage circuit 114 to generate less than 1,000 horsepower of braking effort. This braking effort can be created by the motors 118 using regenerative braking. The regenerative braking also creates electric current, which can be conducted through the conductive pathways 106 of the storage circuit 114 to the storage device(s) 116. This current can charge the storage device(s) 116. Because the amount of generated braking effort is controlled to be less than the generated tractive effort, the vehicle system 102 will continue moving along the route(s). The controller 120 can later return to powering the motors 118 with the energy stored in the storage device(s) 116 to propel the vehicle system 102, such as when the vehicle system 102 is required to reduce emissions or noise during travel or when additional power is required such as traveling up an incline or through a tunnel. Operating in this way can permit the charging system 100 to charge the storage device(s) 116 while the vehicle system 102 is moving and without the need for the storage circuit 114 that includes the storage device(s) 116 to be connected with the conversion device 108.

In one embodiment, the controller 120 may not wait for the charging level or state of the storage device 116 to drop below a threshold before charging the storage device 116. Instead, the controller 120 may direct the motors 110 of the conversion circuit 104 to generate excess or surplus tractive effort and direct the motors 118 of the storage circuit 114 to generate braking effort while the vehicle system 102 is traveling on a downhill grade. Traveling downhill can allow for the motors 118 of the storage circuit 114 to generate increased braking effort and/or the motors 110 of the conversion circuit 104 to generate less excess or surplus tractive effort for charging the storage device 116 than could be needed during travel on flat or uphill grades. The controller 120 can determine when the vehicle system 102 is traveling on a downhill grade based on operator input and/or based on sensor output (e.g., output from an accelerometer, a global positioning system receiver, etc.).

Optionally, both circuits 104, 114 may include motors 110, 118 that are braking at the same time. For example, the controller 120 can direct the motors 110 in the conversion circuit 104 and the motors 118 in the storage circuit 114 to concurrently or simultaneously brake. The braking by the motors 110 may create regenerative current that can be dissipated as heat (instead of used to charge any of the storage devices 116 as the storage devices 116 are not able to receive current from the conversion circuit 104). The braking by the motors 118 may create regenerative current that can be used to charge the storage devices 116, as described herein.

The controller 120 can control which motors 110, 118 are braking based on how much current the storage device(s) 116 are storing or can store. For example, batteries can have maximum power ratings (or capacities) that define how much electric energy or power that the batteries can store. The controller 120 can direct the motors 118 in the storage circuit 114 to brake and generate current for charging the storage device(s) 116 (while the motors 110 in the conversion circuit 104 are not braking) until the storage devices 116 are fully charged (e.g., are at or within a designated amount, such as 5%, of the maximum power ratings of the storage devices 116). At that point, the controller 120 can direct the motors 118 to stop braking (and therefore not generating more current to charge the storage device(s) 116 and can direct the motors 110 to begin braking.

Figure 2:
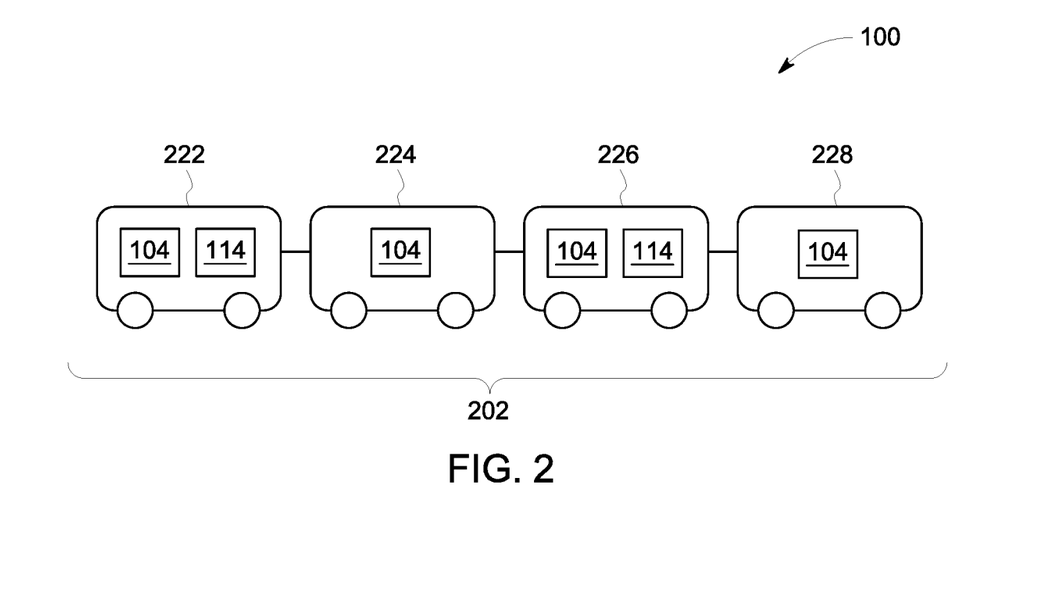
FIG. 2 illustrates another embodiment of the charging system shown in FIG. 1 deployed on a multi-vehicle system.

FIG. 2 illustrates another embodiment of the charging system 100 deployed on a multi-vehicle system 202. In the illustrated embodiment, the vehicle system 202 is formed from multiple vehicles 222, 224, 226, 228. The vehicles 222, 226 may be the same type of vehicles as the vehicle system 102 shown in FIG. 1. For example, the vehicles 222, 226 may each include both the conversion circuit 104 and the storage circuit 114, as well as other components shown and/or described in connection with FIG. 1. The vehicles 224, 228 may be different from the vehicle system 102 shown in FIG. 1. For example, the vehicles 224, 228 may include the engine circuit 104 but not the storage circuit 114. These vehicles 224, 228 may be non-hybrid vehicles.

One or more of the vehicles 222, 224, 226, 228 can include the controller 120 shown in FIG. 1. This controller 120 can be communicatively coupled with controllers onboard other vehicles in the vehicle system 202 and/or with the engines 112 and/or motors 110, 118 of the other vehicles to allow the controller 120 to remotely control operation of the other vehicles. In one embodiment, the controller 120 that controls operation of the vehicles 222, 224, 226, 228 can be disposed onboard a hybrid vehicle 222, 226. Alternatively, the controller 120 that controls operation of the vehicles 222, 224, 226, 228 can be disposed onboard a vehicle 224, 228 that is not a hybrid vehicle.

The controller 120 can monitor the charge level or state of one or more storage device(s) 116 in the storage circuits 114 of one or more of the vehicles 222, 224, 226, 228 in the vehicle system 202. If the controller 120 decides to charge a storage device 116, then the controller 120 can direct the motors 118 in the storage circuit 114 that also includes the storage device 116 to be charged to generate current using regenerative braking. The controller 120 can direct the motors 110 and/or 118 onboard one or more other vehicles 222, 224, 226, 228 to generate surplus tractive effort to continue propelling the vehicle system 202.

For example, the storage device 116 in the storage circuit 114 onboard the vehicle 226 may need to be charged. The controller 120 can direct the motors 118 in the storage circuit 114 of the vehicle 226 to generate current using regenerative braking. The controller 120 optionally can direct the motors 110 in the conversion circuit 104 onboard the same vehicle 226 to stop generating tractive effort or to generate some tractive effort. The controller 120 can direct the motors 110 and/or 118 onboard one or more, or all, other vehicles 222, 224, 228 (and, optionally, the vehicle 226) to generate tractive effort in excess of the braking effort generated by the vehicle 226 so that the vehicle system 202 continues moving while the storage device 116 onboard the vehicle 226 is charged. Optionally, the In one embodiment, the controller 120 can distribute or allocate the amount of surplus tractive effort that is to be generated among the vehicles 222, 224, 226, 228 so that the motors 110 of the vehicles 222, 224, 226, 228 that generate the extra tractive effort each generate a lesser amount of extra tractive effort than would otherwise be needed if only one of the vehicles 222, 224, 226, 228 was generating the extra tractive effort. For example, if a surplus of 1,000 horsepower is needed to be generated by the motors 110 in the vehicles 222, 224, 228 to charge the storage device 116 of the vehicle 226, then the controller 120 can direct the motors 110 in the vehicle 222 to generate 350 surplus horsepower (e.g., 261 kilowatts), the motors 110 in the vehicle 224 to generate 300 surplus horsepower (e.g., 224 kilowatts), and the motors 110 in the vehicle 228 to generate 350 surplus horsepower, instead of the motors 110 in one vehicle 222, 224, 228 generating the extra 1,000 horsepower. The allocation of horsepower to be generated among the vehicles 222, 224, 226, 228 can be completed to increase (e.g., maximize) the efficiency of the vehicle system, such as by consuming some fuel, but less fuel than a different allocation of the horsepower.

Figure 3:
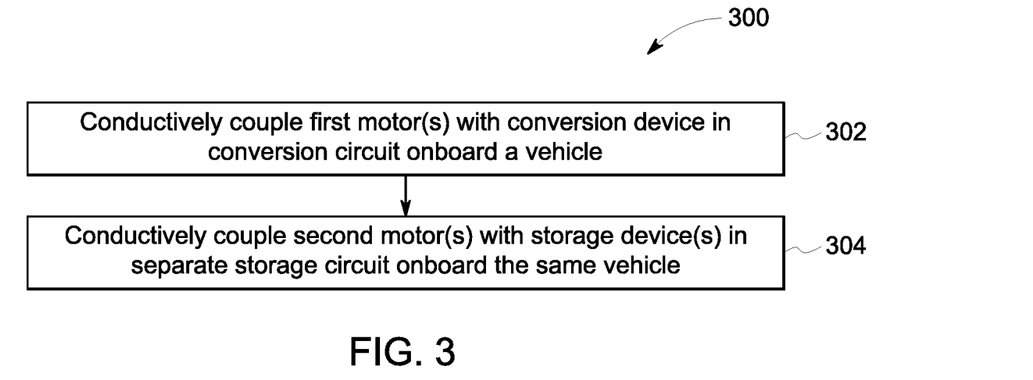
FIG. 3 illustrates a flowchart of one embodiment of a method for creating a vehicle battery charging system.

FIG. 3 illustrates a flowchart of one embodiment of a method 300 for creating a vehicle battery charging system. The method 300 can represent at least some operations that are performed to create one or more embodiments of the charging system 100 described herein. At 302, an electrical conversion device is conductively coupled with one or more first motors of a vehicle system using a conversion circuit of the vehicle system. For example, the conversion circuit 104 can be created by coupling the conversion device 108 and the motors 110 with each other. At 304, one or more storage devices are conductively coupled with one or more second motors of the vehicle system using a storage circuit of the vehicle system. For example, the storage device 116 can be conductively coupled with the motors 118. The circuits 104, 114 are separate from each other such that current in one circuit 104 or 114 cannot pass to the other circuit 114 or 104 via a conductive or inductive pathway.

Figure 4:
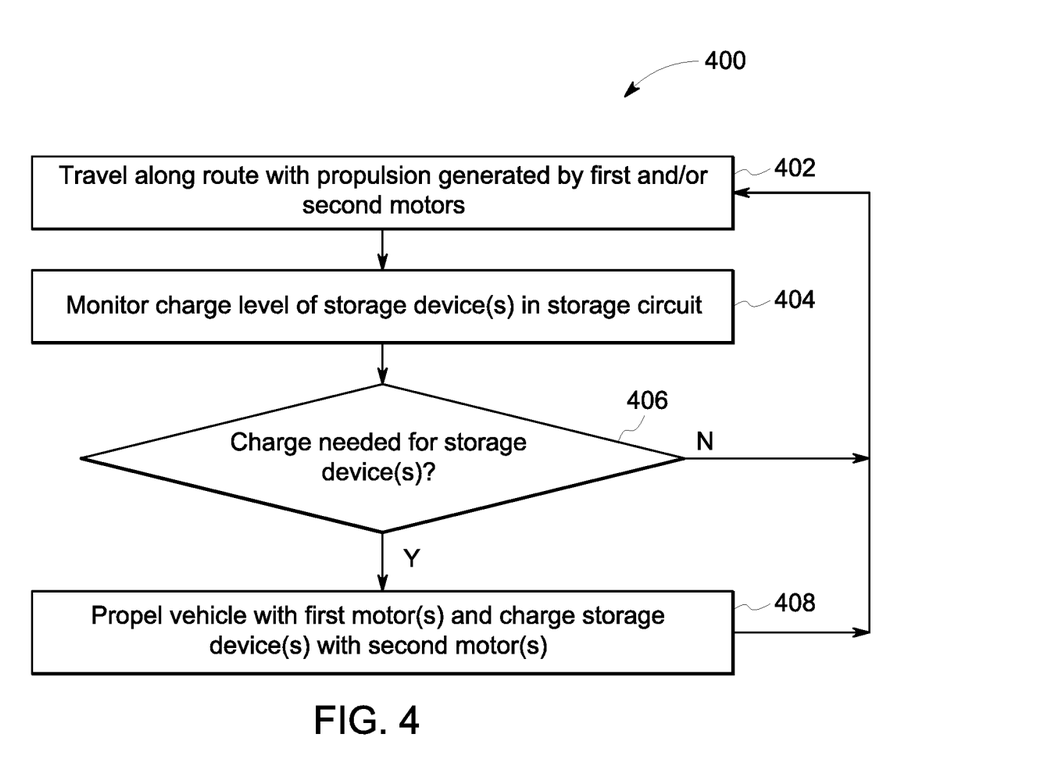
FIG. 4 illustrates a flowchart of one embodiment of a method for controlling a vehicle battery charging system.

FIG. 4 illustrates a flowchart of one embodiment of a method 400 for controlling a vehicle battery charging system. The method 400 can be used to control operation of the charging systems 100 described herein. The method 400 can represent operations performed by the controller 120 and/or operations performed by other components described herein as directed by the controller 120.

At 402, a vehicle system travels along one or more routes. The vehicle system can be propelled by tractive effort generated by one or more motors 110 in a conversion circuit 104 and/or one or more motors 118 in a storage circuit 114. As described above, these circuits 104, 114 are completely separate from each other such that the source of current used to power the motors 110, 118 in each circuit 104, 114 is only located in that same circuit 104, 114. For example, the source of current for powering the motors 110 in the conversion circuit 104 is the conversion device 108 in the same engine circuit 104. The source of current for the motors 118 in the storage circuit 114 is the storage device(s) 116 in the storage circuit 114. No motor 110 in the engine circuit 104 is ever powered with any current from the storage device(s) 116, and no motor 118 in the storage circuit 114 is ever powered with any current from the conversion device 108 in one embodiment.

At 404, the charge level of the storage device(s) is monitored. For example, a sensor can repeatedly measure and report the amount of electric energy stored in the storage device(s) 116 in the storage circuit 114. The controller 120 can monitor this amount of electric energy based on output from the sensor.

At 406, a determination is made as to whether a storage device needs to be charged. The controller 120 can make this determination by comparing the charge level of the storage device 116 to a threshold. If the charge level is below the threshold, then the controller 120 can determine that the storage device 116 needs to be charged. As another example, the controller 120 can make this decision by determining whether the vehicle system is traveling on a downhill grade. If the vehicle system is traveling downhill, then the controller 120 may determine that the storage device 116 can be charged while the vehicle system has momentum and/or pull down the grade of the route. As another example, the controller 120 can make this decision by determining if the vehicle system will require additional tractive effort in the near future (e.g., the vehicle is approaching a steep incline or a tunnel) which could be supplied by the storage device, in which case the storage device would be precharged to be able to supply this tractive effort so that, upon reaching the location(s) needing additional tractive effort, the storage device 116 is already charged with enough energy to power the traction motor(s) to propel or help propel the vehicle through or over the location(s) requiring additional tractive effort. If the storage device is to be charged, then flow of the method 400 can proceed toward 408. If the storage device is not to be charged, then flow of the method 400 can return toward 402.

At 408, the storage device is charged using energy generated by the motor(s) in the same storage circuit as the storage device. For example, the controller 120 can direct the motor(s) 118 in the storage circuit 114 to use regenerative braking to create current. This current is directed into the storage device 116 to charge the storage device 116. The controller 120 can direct the motor(s) 110 in the same vehicle or in another connected vehicle to generate extra tractive effort so that the net tractive effort and regenerative braking effort of the motors 110, 118 is positive and large enough to propel the vehicle system. Flow of the method 400 can then return toward 402.

In one embodiment, a system is provided that includes a conversion circuit of a vehicle system that conductively couples a conversion device with one or more first motors of the vehicle system. The electrical conversion device is configured to convert non-electrical energy into conversion-based electric current that is conducted in the conversion circuit to the one or more first motors to power the one or more first motors. The system also includes a storage circuit of the vehicle system that conductively couples a storage device with one or more second motors of the vehicle system. The storage device is configured to supply stored electric current to the one or more second motors of the vehicle system to power the one or more second motors. The system also includes a controller configured to control the one or more second motors to brake and generate charging electric current that is conducted through the storage circuit to the storage device to charge the storage device. The conversion circuit and the storage circuit are separate circuits such that the storage device is not charged with the conversion-based electric current conducted in the conversion circuit.

Optionally, all motors of the vehicle can operate in a traction mode (e.g., generating propulsive effort) or in braking mode (e.g., generating braking effort) at the same time. The motors of the storage circuit can generate tractive effort or braking effort while also charging (due to as least some regenerative braking effort being collected from the generated tractive effort being less than motors of the conversion circuit). The motors of the conversion circuit can generate tractive effort or braking effort by running some dynamic brake grids (e.g., electric heaters) to dissipate the electric power.

Optionally, the vehicle system is formed from a single vehicle having both the conversion circuit and the separate storage circuit.

Optionally, the vehicle system is formed from at least first and second vehicles coupled with each other to travel together along one or more routes. The conversion circuit is entirely disposed onboard the first vehicle and the storage circuit is entirely disposed onboard the second vehicle.

Optionally, the conversion device is one or more of, an alternator that converts rotational movement created by an engine into the conversion-based electric current, a generator that converts the rotational movement created by the engine into the conversion-based electric current, or a fuel cell that converts fuel and air into the conversion-based electric current.

Optionally, the controller is configured to control the one or more first motors to generate propulsive effort while the one or more second motors generate the charging electric current using regenerative braking.

Optionally, the controller is configured to control the one or more first motors to generate more propulsive effort than braking effort generated by the one or more second motors to move the vehicle system along one or more routes.

Optionally, the conversion circuit and the storage circuit are isolated from each other such that the conversion circuit and the storage circuit are not conductively coupled with each other and are not inductively coupled with each other.

In one embodiment, a method is provided that includes conductively coupling a conversion device with one or more first motors of a vehicle system using a conversion circuit of the vehicle system. The conversion device is configured to convert non-electrical energy into conversion-based electric current that is conducted in the conversion circuit to the one or more first motors to power the one or more first motors. The method also includes conductively coupling a storage device with one or more second motors of the vehicle system using a storage circuit of the vehicle system. The storage device is configured to supply stored electric current to the one or more second motors of the vehicle system to power the one or more second motors. The one or more first motors are configured to generate propulsive effort to propel the vehicle system while the one or more second motors are controlled to brake and generate charging electric current that is conducted through the storage circuit to the storage device to charge the storage device. The conversion circuit and the storage circuits are separate circuits such that the storage device is not charged with the conversion-based electric current conducted in the conversion circuit.

Optionally, conductively coupling the conversion device with the one or more first motors using the conversion circuit and conductively coupling the storage device with the one or more second motors using the storage circuit occurs on a single vehicle of the vehicle system.

Optionally, conductively coupling the conversion device with the one or more first motors using the conversion circuit occurs onboard a first vehicle of plural vehicles that form the vehicle system. Conductively coupling the storage device with the one or more second motors using the storage circuit can occur onboard a second vehicle of the vehicles that form the vehicle system.

Optionally, controlling the one or more first motors to generate propulsive effort while the one or more second motors are controlled to brake includes controlling the one or more first motors to generate more propulsive effort than braking effort generated by the one or more second motors to move the vehicle system along one or more routes.

Optionally, conductively coupling the conversion device with the one or more first motors using the conversion circuit and conductively coupling the storage device with the one or more second motors using the storage circuit includes electrically and inductively isolating the conversion circuit and the storage circuit from each other.

In one embodiment, a system is provided that includes a vehicle controller configured to control one or more first motors and one or more second motors of a vehicle system. The one or more first motors are conductively coupled with a conversion device by a conversion circuit of the vehicle system, the one or more second motors conductively coupled with a storage device by a storage circuit of the vehicle system. The conversion device is configured to convert non-electrical energy into conversion-based electric current that is conducted in the conversion circuit to the one or more first motors to power the one or more first motors. The storage device is configured to supply storage-based electric current to the one or more second motors of the vehicle system to power the one or more second motors. The controller is configured to control the one or more second motors to brake and generate charging electric current that is conducted through the storage circuit to the storage device to charge the storage device while the one or more first motors generate propulsive effort to propel the vehicle system. The conversion circuit and the storage circuit are separate circuits such that the storage device is not charged with the conversion-based electric current conducted in the conversion circuit.

Optionally, the vehicle system is formed from a single vehicle having both the conversion circuit and the separate storage circuit.

Optionally, the vehicle system is formed from at least first and second vehicles coupled with each other to travel together along one or more routes. The conversion circuit is entirely disposed onboard the first vehicle and the storage circuit is entirely disposed onboard the second vehicle.

Optionally, the conversion device is one or more of an alternator that converts rotational movement created by an engine into the conversion-based electric current, a generator that converts the rotational movement created by the engine into the conversion-based electric current, or a fuel cell that converts chemical energy into the conversion-based electric current.

Optionally, the conversion circuit and the storage circuit are isolated from each other such that the conversion circuit and the storage circuit are not conductively coupled with each other and are not inductively coupled with each other.

Optionally, the vehicle controller is configured to direct the one or more second motors of the storage circuit to brake and generate the charging electric current until the storage device is fully charged, and the vehicle controller is configured to direct the one or more first motors of the conversion circuit to begin braking subsequent to the storage device being fully charged.

Optionally, the conversion circuit and the storage circuit are not coupled by any switching devices.

Optionally, the conversion device is coupled with an engine and converts movement created by the engine into the conversion-based electric current, and wherein the storage-based electric current is regenerative current created by the one or more second motors during braking by the one or more second motors As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a conversion circuit of a vehicle system that conductively couples a conversion device with one or more first motors of the vehicle system, the conversion device configured to convert non-electrical energy into conversion-based electric current that is conducted in the conversion circuit to the one or more first motors to power the one or more first motors;
a storage circuit of the vehicle system that conductively couples a storage device with one or more second motors of the vehicle system, the storage device configured to supply stored electric current to the one or more second motors of the vehicle system to power the one or more second motors; and
a controller configured to control the one or more second motors to brake and generate charging electric current that is conducted through the storage circuit to the storage device to charge the storage device,
wherein the conversion circuit and the storage circuit are separate circuits such that the storage device is not charged with the conversion-based electric current conducted in the conversion circuit.

2. The system of claim 1, wherein the vehicle system is formed from a single vehicle having both the conversion circuit and the separate storage circuit.

3. The system of claim 1, wherein the vehicle system is formed from at least first and second vehicles coupled with each other to travel together along one or more routes, wherein the conversion circuit is entirely disposed onboard the first vehicle and the storage circuit is entirely disposed onboard the second vehicle.

4. The system of claim 1, wherein the conversion device is one or more of:
an alternator that converts rotational movement created by an engine into the conversion-based electric current,
a generator that converts the rotational movement created by the engine into the conversion-based electric current, or
a fuel cell that converts fuel and air into the conversion-based electric current.

5. The system of claim 1, wherein the controller is configured to control the one or more first motors to generate propulsive effort while the one or more second motors generate the charging electric current using regenerative braking.

6. The system of claim 5, wherein the controller is configured to control the one or more first motors to generate more propulsive effort than braking effort generated by the one or more second motors to move the vehicle system along one or more routes.

7. The system of claim 1, wherein the conversion circuit and the storage circuit are isolated from each other such that the conversion circuit and the storage circuit are not conductively coupled with each other and are not inductively coupled with each other.

8. A method comprising:
conductively coupling a conversion device with one or more first motors of a vehicle system using a conversion circuit of the vehicle system, the conversion device configured to convert non-electrical energy into conversion-based electric current that is conducted in the conversion circuit to the one or more first motors to power the one or more first motors; and
conductively coupling a storage device with one or more second motors of the vehicle system using a storage circuit of the vehicle system, the storage device configured to supply stored electric current to the one or more second motors of the vehicle system to power the one or more second motors, wherein the one or more first motors are configured to generate propulsive effort to propel the vehicle system while the one or more second motors are controlled to brake and generate charging electric current that is conducted through the storage circuit to the storage device to charge the storage device,
wherein the conversion circuit and the storage circuits are separate circuits such that the storage device is not charged with the conversion-based electric current conducted in the conversion circuit.

9. The method of claim 8, wherein conductively coupling the conversion device with the one or more first motors using the conversion circuit and conductively coupling the storage device with the one or more second motors using the storage circuit occurs on a single vehicle of the vehicle system.

10. The method of claim 8, wherein conductively coupling the conversion device with the one or more first motors using the conversion circuit occurs onboard a first vehicle of plural vehicles that form the vehicle system, and wherein conductively coupling the storage device with the one or more second motors using the storage circuit occurs onboard a second vehicle of the vehicles that form the vehicle system.

11. The method of claim 8, wherein controlling the one or more first motors to generate propulsive effort while the one or more second motors are controlled to brake includes controlling the one or more first motors to generate more propulsive effort than braking effort generated by the one or more second motors to move the vehicle system along one or more routes.

12. The method of claim 8, wherein conductively coupling the conversion device with the one or more first motors using the conversion circuit and conductively coupling the storage device with the one or more second motors using the storage circuit includes electrically and inductively isolating the conversion circuit and the storage circuit from each other.

13. A system comprising:
a vehicle controller configured to control one or more first motors and one or more second motors of a vehicle system, the one or more first motors conductively coupled with a conversion device by a conversion circuit of the vehicle system, the one or more second motors conductively coupled with a storage device by a storage circuit of the vehicle system that is separate from the conversion circuit,
wherein the conversion device is configured to convert non-electrical energy into conversion-based electric current that is conducted in the conversion circuit to the one or more first motors to power the one or more first motors, wherein the storage device is configured to supply storage-based electric current to the one or more second motors of the vehicle system to power the one or more second motors; and wherein the controller is configured to control the one or more second motors to brake and generate charging electric current that is conducted through the storage circuit to the storage device to charge the storage device while the one or more first motors generate propulsive effort to propel the vehicle system, wherein the conversion circuit and the storage circuit are separate circuits such that the storage device is not charged with the conversion-based electric current conducted in the conversion circuit.

14. The system of claim 13, wherein the vehicle system is formed from a single vehicle having both the conversion circuit and the separate storage circuit.

15. The system of claim 13, wherein the vehicle system is formed from at least first and second vehicles coupled with each other to travel together along one or more routes, wherein the conversion circuit is entirely disposed onboard the first vehicle and the storage circuit is entirely disposed onboard the second vehicle.

16. The system of claim 13, wherein the conversion device is one or more of an alternator that converts rotational movement created by an engine into the conversion-based electric current, a generator that converts the rotational movement created by the engine into the conversion-based electric current, or a fuel cell that converts chemical energy into the conversion-based electric current.

17. The system of claim 13, wherein the conversion circuit and the storage circuit are isolated from each other such that the conversion circuit and the storage circuit are not conductively coupled with each other and are not inductively coupled with each other.

18. The system of claim 13, wherein the vehicle controller is configured to direct the one or more second motors of the storage circuit to brake and generate the charging electric current until the storage device is fully charged, and the vehicle controller is configured to direct the one or more first motors of the conversion circuit to begin braking subsequent to the storage device being fully charged.

19. The system of claim 13, wherein the conversion circuit and the storage circuit are not coupled by any switching devices.

20. The system of claim 13, wherein the conversion device is coupled with an engine and converts movement created by the engine into the conversion-based electric current, and wherein the storage-based electric current is regenerative current created by the one or more second motors during braking by the one or more second motors.

* * * * *